3,814,759
IMIDAZO, PYRIMIDO AND DIAZEPINO BENZO-
THIAZOLECARBOXYLIC ACID ESTERS
Peter H. L. Wei, Springfield, Pa., assignor to American
Home Products Corporation, New York, N.Y.
No Drawing. Filed Mar. 17, 1971, Ser. No. 125,377
Int. Cl. C07d 51/46
U.S. Cl. 260—251 A        4 Claims

ABSTRACT OF THE DISCLOSURE

Imidazo, pyrimido and diazepino benzothiazolecarboxylic acid esters,

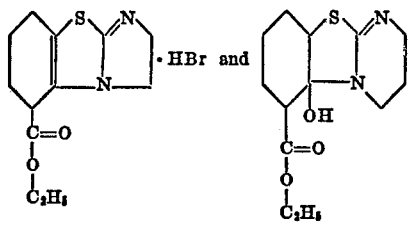

DESCRIPTION OF THE INVENTION

This invention is concerned with the preparation of novel pharmacologically active compounds of Formula I and Formula II:

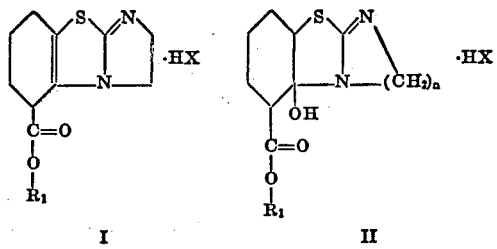

wherein $R_1$ is lower alkyl and X is halogen; $n$ is the integer 3 or 4.

The compounds of Formula I are prepared by the following reaction scheme:

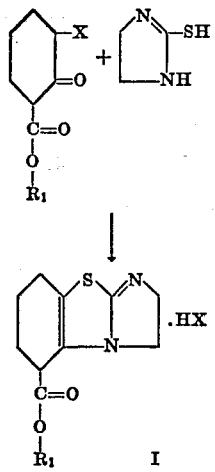

wherein X is halogen and $R_1$ is lower alkyl.

The process involves heating a glacial acetic acid solution of the reactants at a temperature of about 80° to about 100° C. for a period of about ½ hour or longer. The solvent is then removed and the product is recrystallized from a suitable solvent such as acetone or dimethoxyethane.

The compounds of Formula II are prepared by the following reaction scheme:

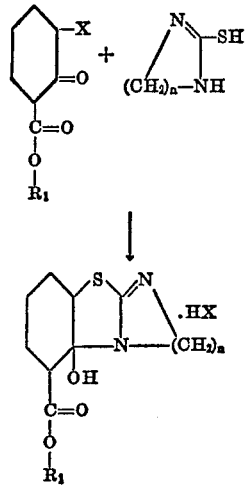

wherein X, $R_1$ and $n$ are the same as hereinabove described.

The process of preparing compounds of Formula II is carried out in a manner which is completely analogous to the process of preparing compounds of Formula I.

As used herein the term (lower)alkyl is used to include hydrocarbon radicals such as methyl, ethyl, n-propyl, i-propyl and n-butyl. The term halogen is used to include chlorine and bromine.

In the evaluation of the biological activity of the compounds of this invention, the *in vivo* effects were tested as follows: The compound was administered orally or intraperitoneally to three mice (14 to 24 grams) at each of the following doses: 400, 127, 40 and 12.7 milligrams per kilogram of host body weight (MPK). The animals were watched for a minimum of two hours during which time signs of general stimulation (i.e., increased spontaneous motor activity, hyperactivity on tactile stimulation, twiching), general depression (i.e., decreased spontaneous motor activity, decreased respiration), autonomic activity (i.e., miosis, midriasis, diarrhea) were noted.

The compounds of this invention induce central nervous system depressant effects at a dose of 127 to 400 MPK. Thus the compounds of the invention, have demonstrated utility as pharmacologically active compounds in experimental and comparative pharmacology and are of value in the treatment of mannals, e.g., mice, rats, etc., who are responsive to treatment with central nervous system depressant agents. Specifically the compounds may be administered for the purpose of inducing a calming effect in mammals.

When the compounds of the invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, calcium carbonate and the like. They may be administered orally in the form of solutions which may contain coloring and flavoring agents or they may be administered by parenteral injection, e.g., intramuscular injection. The injectable solution may contain other solutes such as sodium chloride or glucose in a sufficient quantity to render the solution isotonic.

The dosage of the pharmacological agents of the invention will vary with the route of administration and the particular compound chosen.

EXAMPLE I

Ethyl ester of 2,3,5,6,7,8-hexahydro-imidazo[2,1-b] benzothiazole-5-carboxylic acid hydrobromide An acetic acid solution of 6-bromo-2-carbethoxycyclohexanone (10.0 g. or 0.04 m.) and imidazolidin-2-thione (4.5 g. or 0.044 m.) was heated on a steam bath overnight. After a small amount of insoluble material was filtered, the solvent was evaporated. The residue was first treated with ether and then dimethoxyethane. The solid was collected and weighed 11.2 g. The crude material was recrystallized from a mixture of acetone and dimethoxyethane. The analytically pure ethyl ester of 2,3,5,6,7,8-hexahydro-imidazo-[2,1-b]benzothiazole - 5 - carboxylic acid hydrobromide melted at 177–9°.

Analysis.—Calcd. for $C_{12}H_{17}N_2O_2S \cdot Br$: C, 43.24; H, 5.14; Br, 23.97; N, 8.41; S, 9.62. Found: C, 42.89; H, 5.10; Br, 24.18; N, 8.37; S, 9.45.

IR (KBr): OH, 3.25μ; amine HBr, 3.5μ; ester, 5.85μ; C=N, 6.15μ. NMR (CDCl₃): ethoxy, 1.3δ (t); other complex aliphatic, 2.05, 2.6δ and 4.3δ; exchangeable upfield.

By selection of the appropriate starting materials, the following analogous compounds may be prepared:

methyl ester of 2,3,5,6,7,8-hexahydro-imidazo[2,1-b] benzothiazole-5-carboxylic acid hydrobromide n-propyl ester of 2,3,5,6,7,8-hexahydro-imidazo[2,1-b] benzothiazole-5-carboxylic acid hydrobromide n-butyl ester of 2,3,5,6,7,8-hexahydroimidazo[2,1-b] benzothiazole-5-carboxylic acid hydrobromide.

EXAMPLE II 3,4,5a,6,7,8,9,9a - octahydro - 5a - hydroxy-2H-pyrimido-[2,1-b]benzothiazole-6-carboxylic acid, ethyl ester, hydrobromide A glacial acetic acid solution of 6-bromo-2-carbethoxycyclohexanone (10.0 g., .04 m.) and 2-mercaptotetrahydropyrimidine (4.6 g., .04 m.) was heated on a steam bath for ½ hour. The solution was treated with Darco and the solvent was removed. The residue was triturated with ether and dimethoxyethane, and the crude solid material (10.5 g.) was collected. The crude material was recrystallized from acetonitrile, M.P. 174–6°.

Analysis.—Calcd. for $C_{13}H_{20}N_2O_3S \cdot HBr$: C, 42.74; H, 5.79; Br, 21.87; N, 7.67; S, 8.78. Found: C, 42.37; H, 5.76; Br, 22.13; N, 7.75; S, 8.95.

IR (KBr): OH, 3.1μ; amine HBr, 3.4μ; ester 5.75μ; amine HBr, 6.15μ. NMR (DMSO); ethoxy, 1.25δ (t), 4.15δ (q); two types of complex aliphatic, 1.8δ and 3.4δ; two types of exchangeable upfield.

By selection of the appropriate starting materials, the following analogous compounds may be prepared.

3,4,5a,6,7,8,9,9a - octahydro - 5a - hydroxy-2H-pyrimido-[2,1-b]benzothiazole-6-carboxylic acid, methyl ester, hydrobromide 3,4,5a,6,7,8,9,9a - octahydro - 5a - hydroxy-2H-pyrimido-[2,1-b]benzothiazole-6-carboxylic acid, n-butyl ester, hydrobromide 3,4,5a,6,7,8,9,9a-octahydro-5a-hydroxy-2H-pyrimido [2,1-b]benzothiazole-6-carboxylic acid i-propyl ester.

2,3,4,5,6a,7,8,9,10,10a-decahydro-6a-hydroxy-[1,3]-diazepino[2,1-b]benzothiazole-7-carboxylic acid, ethyl ester hydrobromide 2,3,4,5,6a,7,8,9,10,10a-decahydro-6a-hydroxy-[1,3]-diazepino[2,1-b]benzothiazole-7-carboxylic acid, methyl ester hydrobromide 2,3,4,5,6a,7,8,9,10,10a-decahydro-6a-hydroxy-[1,3]-diazepino[2,1-b]benzothiazole-7-carboxylic acid, i-propyl ester hydrobromide.

We claim:
1. A compound of the formula

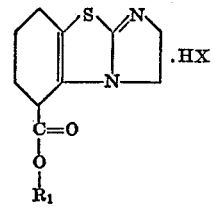

wherein $R_1$ is (lower)alkyl and X is chloro or bromo.

2. A compound as described in claim 1 which is 2,3,5, 6,7,8-hexahydro-imidazo[2,1-b]benzothiazole - 5 - carboxylic acid hydrobromide, ethyl ester.

3. A compound of the formula:

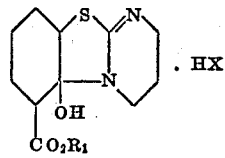

wherein $R_1$ is (lower)alkyl and X is chloro or bromo.

4. A compound as described in claim 3 which is 3,4, 5a,6,7,8,9,9a-octahydro - 5a - hydroxy-2H-pyrimido[2,1-b]benzothiazole-6-carboxylic acid, ethyl ester hydrobromide.

References Cited
UNITED STATES PATENTS 3,507,868   4/1970   Manning _____ 260—251
3,557,110   1/1971   Anderson et al. _____ 260—251

DONALD G. DAUS, Primary Examiner

R. V. RUSH, Assistant Examiner

U.S. Cl. X.R.

260—306.7, 468 R; 424—251, 270